United States Patent [19]

Schwartz

[11] Patent Number: 4,924,148

[45] Date of Patent: May 8, 1990

[54] HIGH BRIGHTNESS PANEL DISPLAY DEVICE

[75] Inventor: James W. Schwartz, Deerfield, Ill.

[73] Assignee: Tektronix, Inc., Beaverton, Oreg.

[21] Appl. No.: 210,955

[22] Filed: Jun. 24, 1988

[51] Int. Cl.[5] .......................... G09G 3/10; G09G 3/22; H01J 1/62; H04N 9/12

[52] U.S. Cl. ................................ 315/169.4; 313/485; 313/495; 313/584; 313/494; 358/56; 358/240; 340/776; 340/758; 340/771; 340/775; 340/825.79

[58] Field of Search ..................... 315/169.4; 313/485, 313/584, 574, 494, 496, 495, 581, 296; 340/752, 758, 799, 769, 771, 776, 781, 811, 775, 825.79; 358/56; 51/240

[56] References Cited

U.S. PATENT DOCUMENTS

| | | | |
|---|---|---|---|
| 3,845,241 | 10/1974 | Schwartz | 178/7.3 D |
| 4,140,944 | 2/1979 | Miller | 315/169.4 |
| 4,200,822 | 4/1980 | Miller | 315/169.4 |
| 4,206,386 | 6/1980 | Akutsu et al. | 315/169.4 |
| 4,227,114 | 10/1980 | De Jule | 313/217 |
| 4,229,766 | 10/1980 | Sipos | 313/485 |
| 4,352,101 | 8/1982 | De Jule | 340/769 |

*Primary Examiner*—Eugene R. Laroche
*Assistant Examiner*—Michael B. Shingleton
*Attorney, Agent, or Firm*—John D. Winkelman; Patrick W. Hughey

[57] ABSTRACT

A high brightness panel display (20) includes a plurality of discrete gas discharge cells (24) sealed against a phosphor-carrying front panel section (26) and operable to produce a high brightness display. Gas discharges are ignited and extinguished in selected gas discharge cells (24) to excite or extinguish associated pixels $P_{m,n}$ that are formed in portions of phosphor strips (35) on the front panel section (26). The gas discharge cells (24) are controlled with electrodes that are common to several cells but driven so that a gas discharge can be ignited or extinguished in one cell without effecting any other cell. Consequently, the pixels may have a 100% per-frame duty cycle, thereby producing very high brightness.

10 Claims, 4 Drawing Sheets

HIGH BRIGHTNESS PANEL DISPLAY DEVICE

TECHNICAL FIELD

This invention pertains to a gas discharge cathodoluminescent panel display device and to a method of operating the device to produce high brightness images.

BACKGROUND INFORMATION

Schwartz, U.S. Pat. No. 3,845,241, entitled "Television Display Panel Having Gas Discharge Cathodo-Luminescent Elements" discloses a display panel that comprises a multitude of light-emissive elements arranged in a matrix across the faceplate of the panel. The elements are selectively ignited to display an image. The light-emissive elements include multiple rows of gas discharge cells that extend horizontally from one side of the panel to the other. The gas discharge cells are sealed against the faceplate. Vertically oriented phosphor strips are carried on the side of the faceplate that is near the gas discharge cells. The portion of each phosphor strip that extends across a cell defines a pixel.

Each gas discharge cell has a cathode at one end and several apart-spaced discharge anodes at the other end. Voltages are applied to the discharge anodes and cathode so that a potential difference is created that is great enough to ignite and sustain a gas discharge in a selected horizontal cell. The gas discharge provides a source of free electrons.

A control electrode grid is positioned near the phosphor strips and extends across all the gas discharge cells. A high-voltage acceleration anode covers the phosphor strips. The control electrode grid and acceleration anode control the free electron flow to the pixels to produce one horizontal line of an image.

After a suitable horizontal line display time, the gas discharge is commuted to an adjacent gas discharge cell. The resultant free electron flow is controlled to produce another line of the image. During each frame period, all of the horizontal rows of gas discharge cells are scanned in the manner just described to display a complete image on the faceplate.

Prior gas discharge cathodoluminescent devices of the type described above suffer from low pixel brightness because any given pixel is actuated for only a relatively short horizontal line time during one frame period. Specifically, a gas discharge is maintained in the scanned cell only during the horizontal line time. During the next line time, the gas discharge is ignited in the adjacent row and the gas discharge in the prior row is extinguished. Therefore, for an exemplary 250 horizontal line display using noninterlaced vertical scanning, the duty cycle of any pixel is 1/250 or 0.4% for each frame.

It can be appreciated that if the per-frame pixel duty cycle were increased, greater brightness would be achieved as a result of the correspondingly increased current applied to the pixels.

SUMMARY OF THE INVENTION

This invention is directed to a gas discharge cathodoluminescent panel display device capable of producing a high brightness display as a result of controlling the gas discharges in a manner that permits 100% per-frame pixel duty cycle.

More particularly, the panel display device comprises a back panel section, a central panel section and a transparent front panel section, all sealed together to form a unitary device. The back panel section has a plurality of cathode grooves formed in one surface. The central panel section has a plurality of anode grooves formed in the surface that is sealed against the grooved surface of the back panel section. The cathode grooves and the anode grooves are configured so that when the back panel section and the central panel section are sealed together, a plurality of discrete gas discharge cells are formed between those panel sections.

The front surface of the central panel section includes a plurality of front grooves formed therein. The front grooves intersect the gas discharge cells and thereby form a plurality of apertures extending completely through the central panel section so that each cell has an aperture opening into it.

The surface of the front panel section that is sealed against the front surface of the central panel section has pixels distributed over it for emitting light in response to electron bombardment. Gas discharges are ignited in selected cells for generating free electrons that pass through the associated apertures to bombard selected pixels and create an image.

More particularly, electrodes are associated with the cathode grooves and anode grooves and are arranged so that portions of two electrodes are disposed within each cell. Each electrode is also common with an aligned group of cells. The electrodes are driven to create within the cells a voltage difference that is either high enough for igniting a gas discharge or is low enough for extinguishing a gas discharge, depending upon whether the associated pixel is to be on or off.

The voltage signals that drive the electrodes are such that a gas discharge can be ignited or extinguished in one cell without affecting a gas discharge in any other cell. Consequently, as the gas discharge cells are scanned row by row, the "on" pixels of each previously scanned row remain on for the entire frame time and, therefore, have a 100% duty cycle.

As another aspect of this invention, current-limiting resistors are incorporated into the gas discharge cells to limit the current generated by the gas discharge and thereby protect the pixels from damage caused by excessive current.

As another aspect of this invention, the cathode grooves formed in the back panel section and the anode grooves formed in the central panel section are defined between pairs of parallel, protruding ribs that intersect to form the plurality of discrete cells.

DETAILED DESCRIPTION OF A PREFERRED EMBODIMENT

Figure 1:
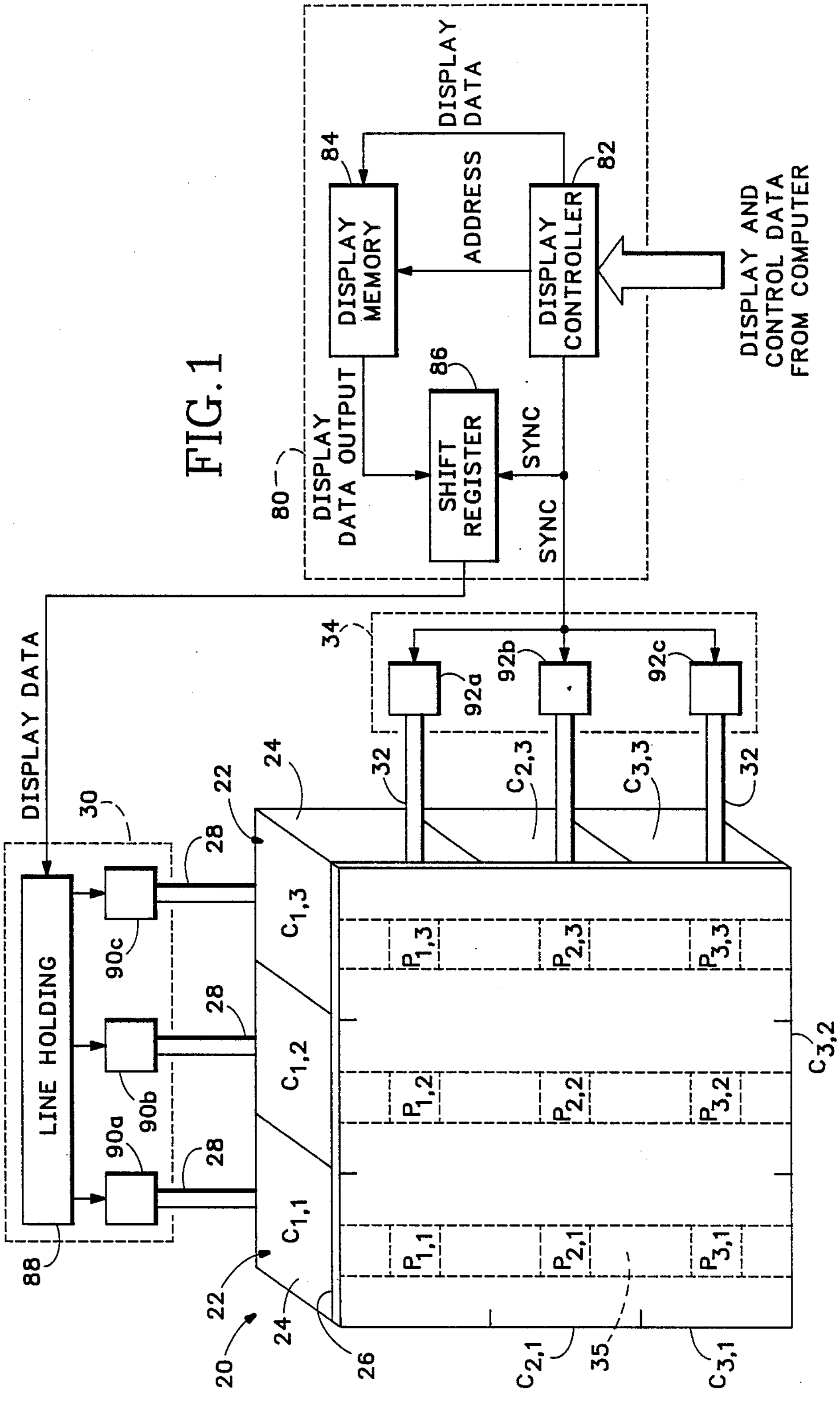
FIG. 1 is a diagram of the primary components of a simplified panel display device of the present invention, along with a suitable system for controlling the operation of the device to achieve a high brightness display.
Figure 2:
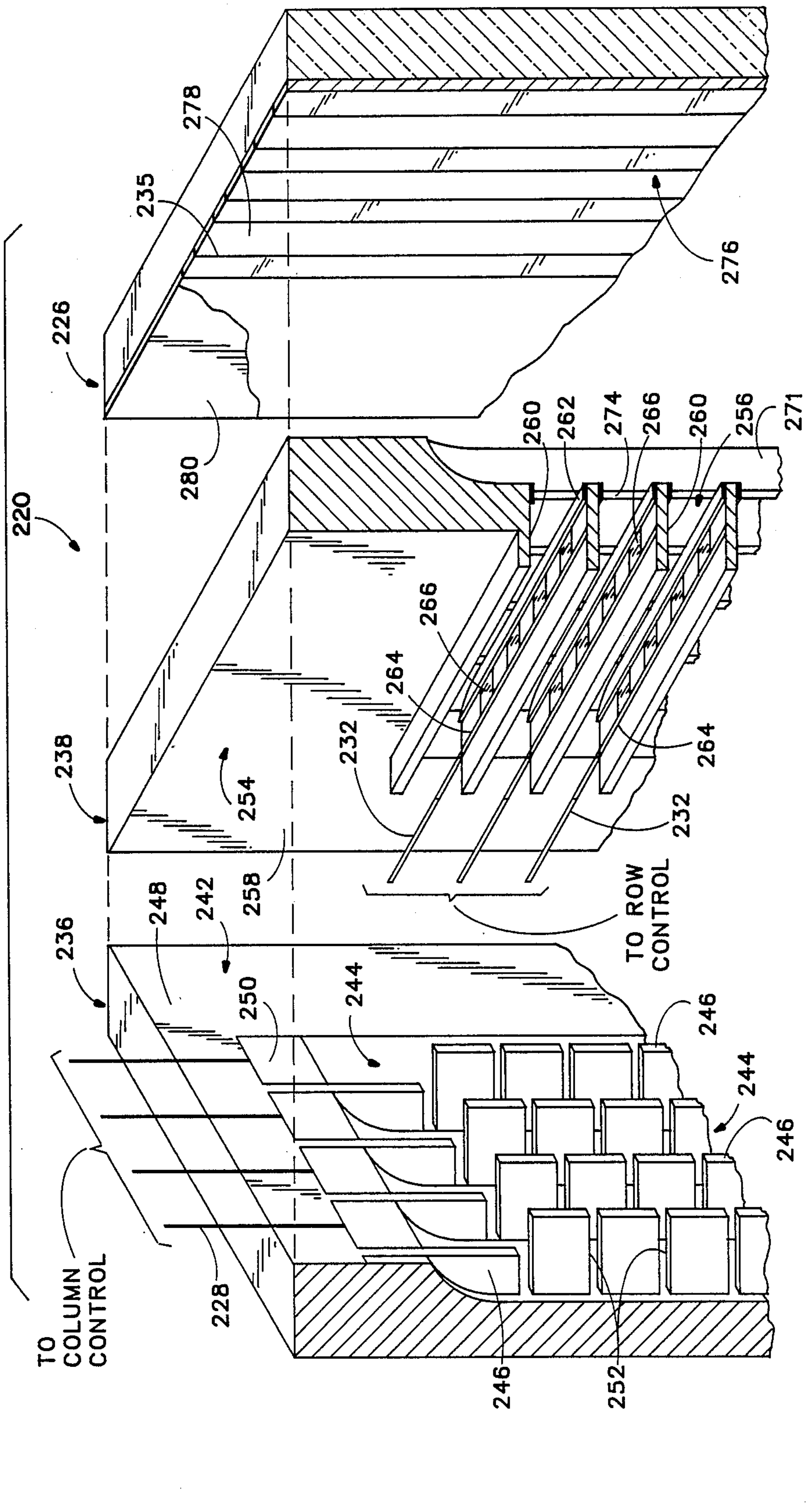
FIG. 2 is an exploded view of a corner of a preferred embodiment of the panel display device, showing the front, back and central panel sections.
Figure 3:
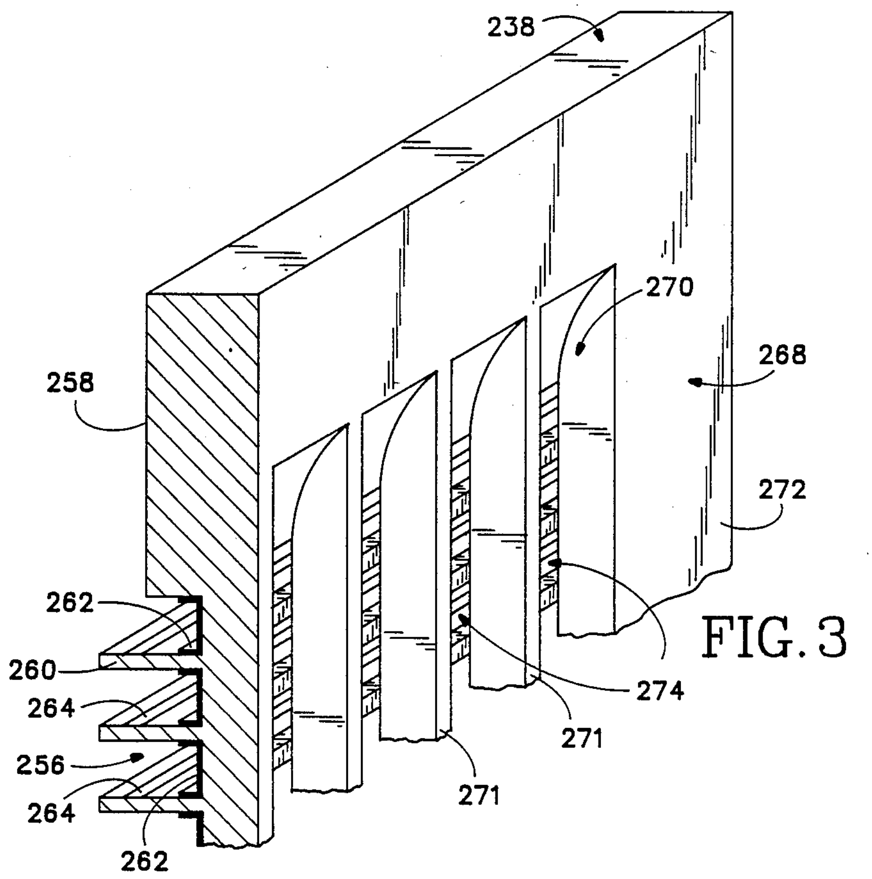
FIG. 3 is a perspective view of the central panel section showing the front surface thereof.
Figure 4:
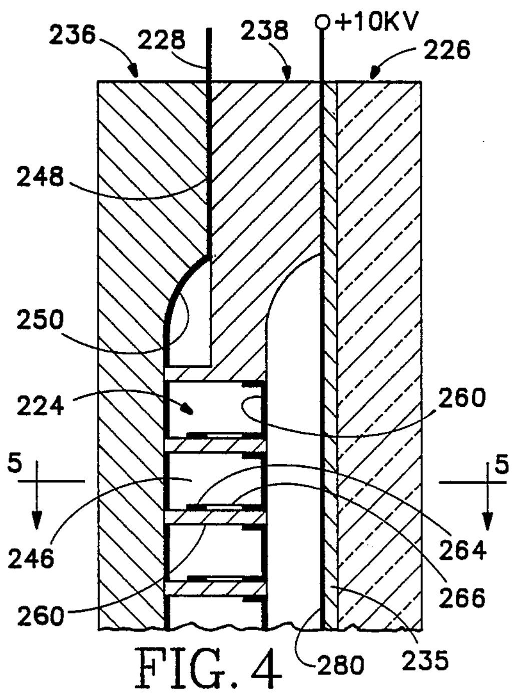
FIG. 4 is a side section assembly view of the device of FIG. 2.
Figure 5:
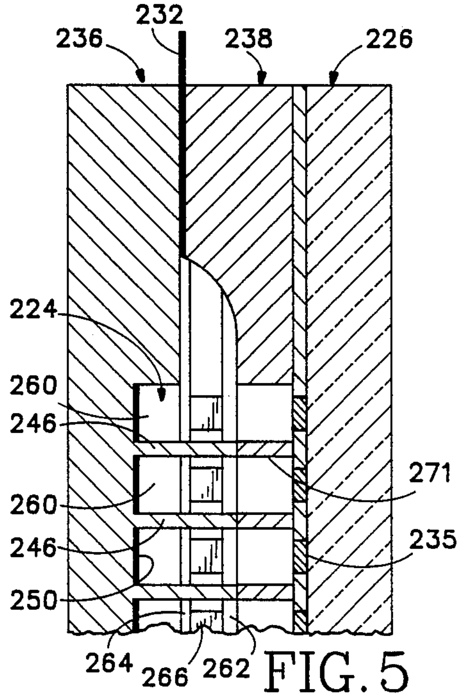
FIG. 5 is a sectional view of the device taken along line 5—5 of FIG. 4.

The diagram of FIG. 1 depicts the primary components of a panel display device formed in accordance with this invention, along with a suitable system for controlling the operation of the device to achieve a high brightness display.

The simplified panel display device 20 of FIG. 1 includes a plurality of gas discharge cathodoluminescent elements (GDC elements) 22 arranged in a matrix of m rows and n columns. In a preferred embodiment (FIGS. 2–5), there are 250 rows and 250 columns of GDC elements. For simplicity, the diagram of FIG. 1 shows a device that comprises a three-row by three-column matrix of GDC elements.

Each GDC element comprises a gas discharge cell 24 sealed against a portion of a transparent glass front panel section 26. The gas discharge cells 24 are discrete cells formed in glass or ceramic material and filled with an ionizable gas such as helium, hydrogen or neon. An electrode (not shown in FIG. 1) extends across the back (i.e., away from the front panel section 26) of each column of gas discharge cells 24. Each electrode serves as a cathode and is connected by a lead 28 to column control circuitry 30.

Another electrode (not shown in FIG. 1) extends across the front of each row of gas discharge cells 24. Each electrode serves as a discharge anode and is connected by a lead 32 to row control circuitry 34.

The column control circuitry 30 and row control circuitry 34 drive the cathodes and discharge anodes to ignite, maintain or extinguish gas discharges in selected gas discharge cells, one row at a time. A gas discharge is ignited in a cell 24 whenever voltages applied to the column cathode and row discharge anode of that cell are such that the gas ions within the cell are continuously drawn into collision with the cathode to release free electrons, which are drawn toward the discharge anode. The free electrons collide with gas atoms and create more ions and free electrons for sustaining the discharge.

An aperture is formed in the front of each gas discharge cell 24. Some of the free electrons created by the gas discharge within the cell pass through the aperture to bombard a vertical strip of cathodoluminescent phosphor 35 (shown as the vertical pairs of dotted lines in FIG. 1) carried on the inner surface of the front panel section 26. The portion of each phosphor strip that is bombarded by the free electrons of one cell forms one pixel. The pixels are outlined in the dotted lines in FIG. 1 and designated $P_{1,1}$ through $P_{3,3}$ in accordance with conventional matrix notation.

The gas discharges in the cells 24 are controlled so that selected pixels are bombarded to produce an image across the front panel section 26 of the display device. More particularly, the gas discharge cells are controlled so that each pixel may have a duty cycle as high as 100%, thereby generating an image with high brightness.

Turning to the particulars of a preferred embodiment of the panel display device constructed and operated in accordance with this invention, and with reference to FIGS. 2–5, the device 220 comprises a back panel section 236, a central panel section 238 and a transparent front panel section 226. The back, front and central panel sections are formed of glass or ceramic material and are sealed together to form a unitary device.

The back panel section 236 has an inner surface 242 into which a plurality of vertically oriented parallel cathode grooves 244 are machined or chemically etched. Each cathode groove is defined between a pair of ribs 246.

At the ends of the cathode grooves 244, the groove depth gradually decreases so that the groove terminates at a flat marginal portion 248 of the inner surface 242. The marginal portion 248 extends continuously around the top, bottom and sides of the inner surface 242. A thin layer of electrically conductive material is applied to the portion of each cathode groove surface that lies between the ribs 246. The conductive layer serves as a cathode 250.

At one end of each cathode groove 244, the cathode 250 extends across the flat marginal portion 248 of the back panel section inner surface 242 to terminate in a lead 228 that is connected to the column control circuitry 30.

Between the terminal portions of the cathode grooves 244, the vertical ribs 246 protrude outwardly from the plane of the flat marginal portion 248 of the inner surface 242. Notches 252 extend through the ribs 246 at apart-spaced locations. The notches 252 are configured to mate with the ribs 260 formed in the back surface 254 of the central panel section 238.

More particularly, the central panel section 238 has a back surface 254 into which a plurality of horizontally oriented parallel anode grooves 256 are machined or chemically etched. At the ends of the anode grooves 256, the groove depth gradually decreases so that the groove terminates at a flat marginal portion 258 of the back surface 254. The marginal portion 258 extends continuously around the top, bottom and sides of the back surface 254 and is sealed against the corresponding flat marginal portion 248 of the back panel section 236.

Each anode groove 256 is defined between a pair of horizontal ribs 260. Between the terminal portions of the anode grooves 256, the horizontal ribs 260 are configured to protrude outwardly from the plane of the flat marginal portion 258 of the back surface 254. Each rib 260 is aligned with a row of notches 252 in the cathode groove ribs 246.

The protruding portions of the vertical cathode groove ribs 246 extend outwardly for a distance sufficient to penetrate the entire depth of the anode grooves 256 when the back section 236 and central panel section 238 are joined. Likewise, the protruding portions of the horizontal ribs 260 of the anode grooves 256 extend outwardly for a distance sufficient to penetrate the entire depth of the cathode grooves 244 when the back and central panel sections are joined. Consequently, each intersecting pair of horizontal and vertical ribs form a discrete gas discharge cell 224 that is substantially isolated from its neighboring cells.

A thin layer of electrically conductive material is applied to the surface of each anode groove 256. The conductive layer extends along the inner surface portion of the anode groove surface that is between each horizontal rib 260, and partly across the inner surface of each rib. The conductive layer serves as a discharge anode 262.

A narrow, thin conductor 264 is applied to the surface of one of the pair of horizontal ribs 260 that define each anode groove 256. The conductor 264 extends next to, but is spaced from, one edge of the discharge anode 262. At one end of each anode groove, the conductor extends from the rib, across the terminal portion of the anode groove surface that is between the ribs, and across the flat marginal portion 258 of the central panel section back surface 254 to terminate in a lead 232 that is connected to the row control circuitry 34. Preferably, the conductor 264 is overlaid with insulative material (not shown) so that current conducted therethrough does not affect the potential differences established in the gas discharge cells 224.

Within each gas discharge cell 224 a resistor 266 is interconnected between the conductor 264 and the discharge anode 262. As will become clear upon reading this description, the resistors 266 serve to limit the current generated by the gas discharge in each cell and protect the pixels from damage.

The front surface 268 of the central panel section 238 has a plurality of vertically oriented parallel front grooves 270 machined or chemically etched therein. Each front groove is defined between a pair of ribs 271. At each end of the front grooves 270, the groove depth gradually decreases so that the groove terminates at a flat marginal portion 272 of the front surface 268. The marginal portion 272 extends continuously around the top, bottom and sides of the front surface 268.

The combined depth of the anode grooves 256 and the front grooves 270 is greater than the thickness of the central panel section 238. Consequently, the anode grooves 256 and front grooves 270 intersect to form a regular array of apart-spaced apertures 274 extending completely through the central panel section 238. It can be appreciated that in view of the construction just described, one aperture 274 is located between each gas discharge cell 224 and the front panel section 226.

The inner surface 276 of the front panel section 226 is sealed against the front surface 268 of the central panel section 238. The inner surface 276 of the front panel section 226 carries a plurality of vertically oriented cathodoluminescent phosphor strips 235. Each phosphor strip 235 is aligned with a column of apertures 274. The phosphor strips 235 are separated by optically nonreflective guard bands 278. The phosphor strips 235 and guard bands 278 are covered with an electrically conductive layer that serves as an acceleration anode 280 for drawing free electrons that pass through the apertures 274 into collision with the portion of the phosphor strip 235 (i.e., pixel) that is across from each aperture.

A panel display device constructed as just described provides a compact arrangement of GDC elements that are controllable to produce a high brightness display wherein the pixel duty cycle may be as high as 100%. The means for controlling the GDC elements to obtain the high brightness display are now described.

Returning to the diagram of FIG. 1, each GDC element of the simplified panel display device 20 includes a gas discharge cell 24 and a corresponding pixel. The cells, like the pixels, will be hereafter individually designated, in accordance with conventional matrix notation, as cells $C_{1,1}$ through $C_{3,3}$. As noted, only nine GDC elements have been shown in the diagram of FIG. 1.

In the preferred embodiment, the device is adapted to display computer-generated information using a row by row scanning technique. Specifically, computer-generated display and control data are transmitted to a conventional display generator 80. The display generator 80 includes a display controller 82 and display memory 84. The display information is stored in the display memory 84 as an array of m by n bits, each bit corresponding to a pixel in the panel. For each frame, the bits are either on or off, depending upon whether the associated pixel will be on or off as the information is displayed.

The display controller 82 includes a clock and sync signal generator (not shown) for producing signals that control the scanning of the display device. In this regard, the display controller 82 sequentially transmits appropriate addresses to the display memory 84 so that the stored display information is output to a shift register 86 one line (row) at a time.

In response to a sync signal generated by the display controller 82, the shift register 86 transfers the line of display information to the column control circuitry 30. The column control circuitry 30 comprises a line-holding register 88 that receives the row of display information (i.e., the plurality of "on" or "off" signals corresponding to each pixel in that row) and applies the information in parallel to two-state column wave generators 90*a*, 90*b* and 90*c*. Each column wave generator is connected, via a lead 28, to a column cathode in the back of the column of gas discharge cells 24. The cathodes are configured the same as the cathodes 250 of FIGS. 2–5.

In response to the "on" or "off" signal applied to it, each column wave generator 90*a*, 90*b* and 90*c* applies a corresponding "on" or "off" DC voltage signal to the connected column cathode. The signals applied by the column wave generators 90*a*, 90*b* and 90*c* have particular waveforms that are described more fully below.

The sync signal that is applied to the shift register 86 for transferring the line of display information to the column control circuitry 30 is simultaneously applied to the row control circuitry 34. The row control circuitry 34 essentially comprises two-state row wave generators 92*a*, 92*b* and 92*c* that are sequentially addressed by the sync signals generated by the display controller 82. Each row wave generator 92*a*, 92*b* and 92*c* is connected to a lead 32 which is connected to a conductive strip that is connected (via a resistor) to a discharge anode in the front of the row of gas discharge cells 24. The conductive strips, resistors and discharge anodes are configured the same as the strips 264, resistors 266 and discharge anodes 262 of FIGS. 2–5.

Normally, the row wave generators 92*a*, 92*b* and 92*c* are in a "nonselected" state wherein their output is a constant DC voltage applied to the associated discharge anode. Whenever addressed by the sync signal during the row by row scanning of the device, the selected row wave generator switches to its "selected" state and applies a particular DC voltage signal to the connected anode for one line time. Typically, for noninterlaced scanning, a line time is 33 microseconds for frames that are scanned 60 times per second.

Figure 6:
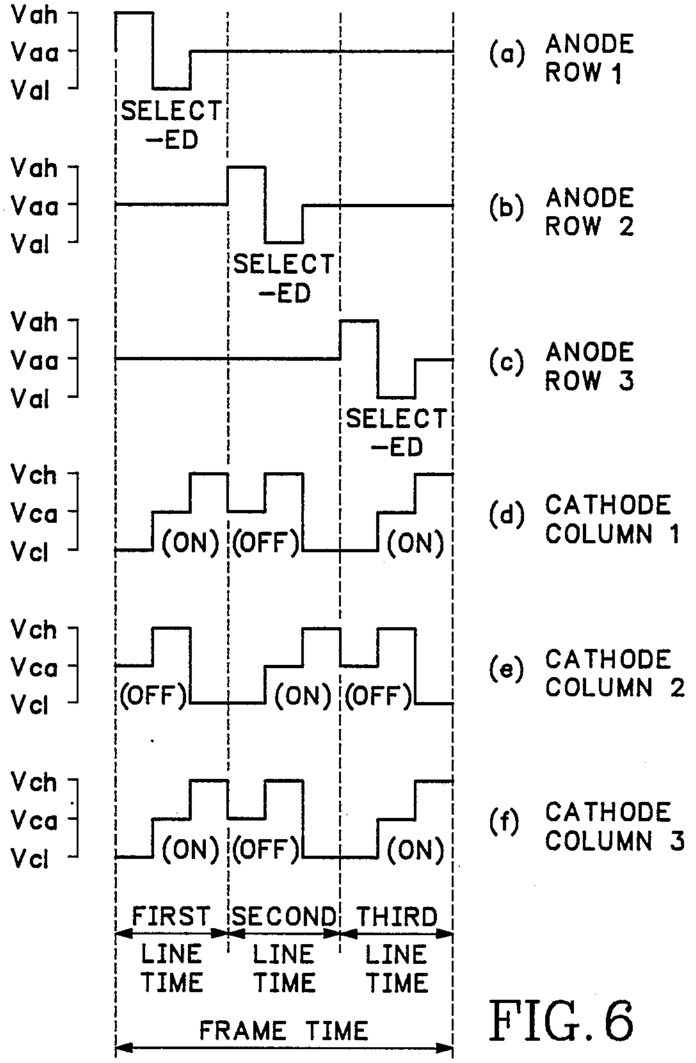
FIG. 6 is a waveforms diagram illustrating a preferred method of driving the anodes and cathodes of the device to create a high brightness image.

The particulars of the waveforms generated by both the row wave generators 92*a*, 92*b* and 92*c* and the column wave generators 90*a*, 90*b*, 90*c* are now discussed with particular reference to FIGS. 1 and 6. The panel display device 20 is scanned row by row, from top to bottom. Gas discharges are established in selected cells of each row. The gas discharges in the cells are established by driving the associated cathodes and discharge anodes so that a potential difference of sufficient magnitude is created within the cell.

As is known in the art, the magnitude of the voltage difference required for igniting or extinguishing a gas discharge is a function of the gas pressure and cathode-to-anode path length. In the preferred embodiment of the invention, the gas pressure is 10 torr and the gas discharge cells are constructed so that the cathode-to-anode path length is approximately 1.0 mm. The voltage difference required to ignite a gas discharge in the cell (the "ignition voltage $V_i$") is 175 volts.

An important characteristic of gas discharges is that, once ignited, the discharge can be maintained at a voltage level less than that required to ignite it. In the preferred embodiment, the voltage difference required to extinguish a gas discharge (the "extinguish voltage $V_e$") is 75 volts.

Beginning with the top row of pixels (i.e., $P_{1,1}$, $P_{1,2}$ and $P_{1,3}$) as the first selected row for scanning, a sync signal is directed by the display controller 82 to the row wave generator 92*a* of the selected row. The selected row wave generator 92*a* produces an output voltage for the first line time in accordance with the waveform depicted in FIG. 6(*a*). The voltage applied to the selected discharge anode by the row wave generator 92*a* is modulated such that during three equal intervals of the line time, the voltage applied to the selected anode changes from a high level $V_{ah}$ to a low level $V_{al}$ and to an average level $V_{aa}$, respectively. During the first line time, the remaining row wave generators 92*b* and 92*c* hold the nonselected discharge anodes at the average voltage $V_{aa}$ as depicted in FIG. 6(*b*) and 6(*c*).

During the first line time, the column cathodes are driven to either ignite a gas discharge (or maintain a discharge existing from a previous scan), or extinguish a gas discharge, in the gas discharge cells $C_{1,1}$, $C_{1,2}$ and $C_{1,3}$ of the selected discharge anode row. To this end, the "on" or "off" signals that correspond to each bit of display information in the line-holding register 88 are applied in parallel to the column wave generators 90*a*, 90*b* and 90*c*. Each generator modulates the voltage of the cathode accordingly.

For example, to display an "X" on the device, the line of display information requires pixels $P_{1,1}$ and $P_{1,3}$ to be on, and pixel $P_{1,2}$ to be off. Accordingly, a gas discharge in cell $C_{1,1}$ and $C_{1,3}$ must be ignited, but the remaining cell $C_{1,2}$ must remain off (or be turned off, if a discharge remains from the previous scan). Accordingly, the appropriate column wave generators 90*a*, 90*c* apply an "on" signal to their associated cathodes for one line time. The waveform of these "on" signals is shown in FIG. 6(*d*) and (*f*). The waveform of the "on" signal is such that during the line time in which it is applied, the voltage difference between the selected row discharge anode and the cathodes of cells $C_{1,1}$ and $C_{1,3}$ will be great enough to ignite a gas discharge, thereby supplying a stream of free electrons to bombard the pixels $P_{1,1}$ and $P_{1,3}$. As noted earlier, the pixels are covered with an acceleration anode (such as anode 280 in FIGS. 2-5) that accelerates the free electron movement to the pixels. The acceleration anode is driven at a voltage of 10,000 volts. Lower acceleration voltage may be applied (for example, as low as 1,000 volts), however, the overall brightness of the display will be correspondingly reduced.

The particular waveform corresponding to the "on" signals that are applied to the cathodes of cells $C_{1,1}$ and $C_{1,3}$ is such that during the first of three equal intervals of the first line time, the cathode is driven at a low voltage $V_{cl}$. The high voltage level $V_{ah}$ of the selected anode (applied to the selected anode during the first interval of the first line time) and the low voltage level $V_{cl}$ of the cathode are such that the resulting voltage difference in the gas discharge cells $C_{1,1}$ and $C_{1,3}$ is greater than the ignition voltage $V_i$, hence a gas discharge is ignited, with attendant bombardment of pixels $P_{1,1}$ and $P_{1,3}$.

During the second interval of the first line time, the cathodes of cells $C_{1,1}$ and $C_{1,3}$ are driven at an average voltage $V_{ca}$ which, in conjunction with the simultaneously applied low voltage $V_{al}$ of the selected anode, provides a voltage difference suitable for maintaining, yet not extinguishing, the gas discharge in the cells $C_{1,1}$ and $C_{1,3}$. Similarly, during the third time interval, the cathodes of cells $C_{1,1}$ and $C_{1,3}$ are driven at a high voltage $V_{ch}$ which, in conjunction with the simultaneously applied average voltage $V_{aa}$ of the selected anode, provides a voltage difference suitable for maintaining, yet not extinguishing, the gas discharge in those cells.

During the first line time, an "off" signal is applied by the column wave generator 90*b* to the cathode associated with cell $C_{1,2}$. The "off" signal is such that during the first line time, the potential difference between the selected anode and the cathode connected to the column wave generator 90*b* is less than the extinguish voltage $V_e$. Accordingly, the gas discharge in the cell $C_{1,2}$ is extinguished and the pixel $P_{1,2}$ is off. If no gas discharge had been established in the cell $C_{1,2}$ during a prior scan, then the voltage applied by the column wave generator 90*b* to turn that cell off has no effect.

The waveform corresponding to the "off" signal applied to the cathode of cell $C_{1,2}$ during the first line time is depicted in FIG. 6(*e*). Specifically, during the first interval, the cathode of cell $C_{1,2}$ is driven at an average voltage $V_{ca}$. The high voltage level $V_{ah}$ in the selected anode during the first interval, and the average voltage level $V_{ca}$ of the cathode are such that the resulting difference is less than the ignition voltage $V_i$. During the second interval, the cathode of cell $C_{1,2}$ is driven at a high voltage $V_{ch}$ which, in conjunction with the simultaneously applied low voltage $V_{al}$ of the selected anode, reduces the voltage difference in the cell $C_{1,2}$ to the level below the extinguish voltage $V_e$, which extinguishes the gas discharge. During the third interval, the cathode of cell $C_{1,2}$ is driven at a low voltage $V_{cl}$ which, in conjunction with the simultaneously applied average voltage $V_{aa}$ of the selected anode, provides a voltage difference that is inadequate to ignite a gas discharge and the cell remains off.

It can be appreciated that the actual voltage levels applied to the selected anode and cathodes may be any of a wide range of values and still ignite or extinguish the gas discharge as necessary. As noted, the voltages applied to the cathodes and selected anode must be such that the potential difference therebetween is greater than the ignition voltage $V_i$ (if a gas discharge is desired) or less than the extinguish voltage $V_e$ (if no gas discharge is desired). For the preferred embodiment, the voltages applied to the cathodes and the anode are: $V_{aa}=150$ volts; $V_{ah}=183$ volts; $V_{al}=117$ volts; $V_{ca}=33$ volts; $V_{ch}=66$ volts; and $V_{cl}=0$ volts.

After the first selected row of pixels $P_{1,1}$, $P_{1,2}$ and $P_{1,3}$ has been displayed for one line time, the gas discharges in the next row of cells corresponding to pixels $P_{2,1}$, $P_{2,2}$ and $P_{2,3}$ are ignited or extinguished as necessary to display the next horizontal line of display information for that frame. Accordingly, during the second line time, the second line of display information is transferred from the display memory 84 to the column control circuitry 30 via the shift register 86. The desired exemplary "X" display requires pixels $P_{2,1}$ and $P_{2,3}$ to be off, and pixel $P_{2,2}$ to be on. This display information is applied to the column cathodes via the column wave generators 90*a*, 90*b*, and 90*c* in a manner similar to that just described with respect to the first line of information. Simultaneously, the row wave generator 92*b* is addressed by the sync signal and responds during the second line time by modulating the voltage applied to the discharge anode of the second selected row in accordance with the waveform depicted in FIG. 6(*b*).

More particularly, as the column cathode of cell $C_{2,1}$ is driven by the control wave generator 90*a* with the "off" voltage signal during the second line time (FIG. 6(*d*)), the low voltage difference ($V_{al}-V_{ch}$) that occurs during the second interval will extinguish any existing gas discharge in that cell. Further, no gas discharge is ignited in cell $C_{2,1}$ during that second line time because the voltage difference in the cell never exceeds the ignition voltage $V_i$ during the other intervals of the second line time.

It is noteworthy that cells $C_{1,1}$ and $C_{2,2}$ have a common column cathode; however, when that cathode is employed to extinguish a gas discharge in one cell $C_{2,1}$, the gas discharge in the associated cell $C_{1,1}$ is not simultaneously extinguished. The gas discharge in the associated cell $C_{1,1}$ is not extinguished because the row wave generator 92*a* corresponding to the discharge anode of the cell $C_{1,1}$ is switched to the "nonselected" state as the scan moves to the second selected row, and the constant voltage $V_{aa}$ applied to the discharge anode of the cell $C_{1,1}$ during the second line time (FIG. 6(*a*) is high enough to keep the overall cell potential greater than the extinguish voltage $V_e$, even though an "off" signal is applied to the column cathode. Accordingly, pixel $P_{1,1}$ is unaffected by the subsequent scanning of the remaining rows of the display device. It can be appreciated therefore, that the "on" pixels of any row will have a per-frame duty cycle of 100%.

As noted, pixel $P_{2,2}$ is to be ignited to display the "X". Accordingly, the column wave generator 90*b* applies the "on" signal to the column cathode during the second line time (FIG. 6(*e*)). As earlier described with respect to the "on" pixels $P_{1,1}$ and $P_{1,3}$, the voltage applied to the (selected) row anode and to the column cathode corresponding to pixel $P_{2,2}$ are such that during the second line time a gas discharge will be ignited in the associated cell $C_{2,2}$ to bombard the pixel $P_{2,2}$ with free electrons.

During the second line time, ignition of the pixel $P_{2,2}$ does not ignite the associated pixel $P_{1,2}$ even though those pixels have a common column cathode. Specifically, during the time the column cathode of cell $C_{2,2}$ is driven by the column wave generator 90*b* with the "on" voltage signal (FIG. 6(*e*)), the constant voltage $V_{aa}$ applied to the anode of the cell $C_{1,2}$ is low enough to keep the overall cell potential less than the ignition voltage $V_i$. Accordingly, pixel $P_{1,2}$ is unaffected by the subsequent scanning of the remaining rows.

During the second line time the gas discharge in cell $C_{2,3}$ is extinguished (hence, the associated pixel $P_{2,3}$ is turned off) in the same manner as just described with respect to pixel $P_{2,1}$. For the reasons described above, turning off pixel $P_{2,3}$ does not affect the "on" pixel $P_{1,3}$ that shares a column cathode with that pixel $P_{2,3}$.

To complete the frame scanning, the row wave generator 92*c* corresponding to the third horizontal line of the display is addressed by the sync signal to apply a "selected" voltage signal to the discharge anode during the third line time (FIG. 6(*c*)). Simultaneously, the column wave generators 90*a*, 90*b* and 90*c* apply the display information to the column cathodes of the cells $C_{3,1}$, $C_{3,2}$ and $C_{3,3}$. The information corresponding to the exemplary "X" display and applied to the third row of cells is identical to the display information applied to the first row of cells. Consequently, the signals applied by the column wave generators to the column cathodes for igniting cells $C_{3,1}$ and $C_{3,3}$ and extinguishing cell $C_{3,2}$, are the same signals as described with respect to the first line of cells $C_{1,1}$, $C_{1,2}$ and $C_{1,3}$.

As noted, the current generated within each gas discharge cell is limited by a resistor 266. The resistors are employed to control the currents that exist in "on" cells. In the preferred embodiment, the resistance is established in the range of $10^6$ to $10^8$ ohms.

Upon study of the waveforms diagram in FIG. 6, it can be appreciated that during the first two intervals of the "selected" anode signal, a high voltage $V_{ah}$, and a relatively low voltage $V_{al}$ are respectively applied. Further, if an "on" signal is applied to a corresponding column cathode, the gas discharge is ignited during the first interval (because $V_{ah}-V_{cl}$ is greater than $V_i$). If an "off" signal is applied to the corresponding column cathode, the gas discharge is extinguished during the second interval (because when $V_{al}-V_{cl}$ is less than $V_e$). It can be appreciated, therefore, that only two distinct voltage intervals are required for the "on" and "off" signal applied to the cathode, and for the "selected" signal applied to the anode. It is preferred, however, to include the third interval in those signals to equalize the time average potential in all cells of a selected row to ensure the discharges in those cells are unaffected when discharges are ignited or extinguished during the line time of the next-selected row of cells.

Although a 100% pixel duty cycle is described above, gray shades can be obtained by modulating the pixel duty cycle. That is, instead of having pixels either on or off for a full frame time, the pixels may be scanned two or three times during a frame time, thereby permitting some of the pixels to be on for only a fraction of the frame time, which produces the desired gray shades.

Although row by row scanning was described above, it is clear that column by column scanning of the device is possible with minor modification of the device. Further, the device is readily adaptable to display information carried by conventional video signals that are processed by known means to supply timed line by line display information to the column and row wave generators.

It will be obvious to those having skill in the art to which the present invention pertains that many other changes may be made in the above described details of the preferred embodiment without departing from the scope of the invention. Therefore, the scope of the present invention is to be determined by the following claims.

I claim:

1. A high brightness panel display device comprising:

(a) a back panel section having a plurality of cathode grooves formed therein;

(b) a central panel section having a front surface and a back surface, the back surface having a plurality of anode grooves formed therein, the cathode grooves and the anode grooves being configured and arranged so that when the back panel section and central panel section are sealed together there resides therebetween a plurality of discrete cells, the central panel section having a plurality of apertures formed through the front surface thereof so that one aperture is connected with each cell;

(c) a front panel section sealed against the front surface of the central panel section, the front panel section carrying pixels distributed over the front panel section for emitting light in response to electron bombardment; and (d) control means operable for addressing all of the cells and generating gas discharges in selected cells for delivering electrons through the connected apertures to bombard selected pixels and create an image.

2. The device of claim 1 wherein the control means includes a plurality of electrodes arranged so that portions of two electrodes are disposed within each cell, each electrode being common with more than one cell, the control means including electrode drive means connected to the electrodes and operable for igniting and extinguishing gas discharges in selected cells without igniting or extinguishing gas discharges in any other cell.

3. The device of claim 2 wherein the electrode drive means includes a current-limiting resistor located within each cell and connected to at least one electrode portion within each cell.

4. The device of claim 1 wherein the cells are arranged in a plurality of aligned groups, the control means operable to address one aligned group at a time, wherein a frame time is defined as the time required for the control means to address all of the aligned groups, the control means adapted to permit maintenance of gas discharges in selected cells of one aligned group during an entire frame time.

5. The device of claim 1 wherein each cathode groove is defined between a pair of parallel first rib members, and wherein each anode groove is defined between a pair of parallel second rib members, the first and second rib members being configured and arranged so that when the central panel section is sealed against the back panel section the first and second rib members intersect to form the plurality of discrete cells.

6. The device of claim 5 wherein the front surface of the central panel section includes a plurality of parallel front grooves formed therein, each front groove configured and arranged to intersect some of the cells to form the apertures.

7. A method of controlling a plurality of gas discharge cells that are arranged in a matrix of two or more rows and two or more columns, wherein each cell in a row of cells has a common row electrode extending therethrough, each cell in a column of cells having common column electrode extending therethrough, each row electrode and column electrode being selectively operable to create a potential difference within the associated cell, the cells having a characteristic ignition potential $V_i$ defined as the minimum potential difference in the cell required to initiate a gas discharge within the cell, the cells also having a characteristic extinguish potential $V_e$ defined as the maximum potential difference in the cell required to extinguish a gas discharge within the cell and wherein $V_i$ is greater than $V_e$, the method comprising the steps of:

(a) selecting a single row electrode of the row electrodes, the remaining row electrodes being nonselected row electrodes;

(b) selecting one or more on column electrodes and selecting one or more off column electrodes;

performing simultaneously the following steps:

(1) applying to the first-selected row electrode a maximum voltage $V_{ah}$ for a first portion of a predetermined time period, and a minimum voltage $V_{al}$ for a second portion of the time period;

(2) applying an average voltage $V_{aa}$ to all nonselected row electrodes for the time period;

(3) applying to the on column electrodes a low voltage $V_{cl}$ during the first portion of the time period such that the difference between $V_{ah}$ and $V_{cl}$ is greater than $V_i$, and the difference between $V_{aa}$ and $V_{cl}$ is less than $V_i$ but greater than $V_e$, and applying to the on column electrodes an average voltage $V_{ca}$ during the second portion of the time period such that the difference between $V_{al}$ and $V_{ca}$ is less than $V_i$ but greater than $V_e$, and the difference between $V_{aa}$ and $V_{ca}$ is greater than $V_e$ but less than $V_i$;

(4) applying to the off column electrodes an average voltage $V_{ca}$ during the first portion of the time period such that the difference between $V_{ah}$ and $V_{ca}$ is less than $V_i$ but greater than $V_e$, and the difference between $V_{aa}$ and $V_{ca}$ is less than $V_i$ but greater than $V_e$, and applying to the off column electrode the voltage $V_{ch}$ during the second portion of the time period such that the difference between $V_{al}$ and $V_{ch}$ is less than $V_e$, and the difference between $V_{aa}$ and $V_{ch}$ is greater than $V_e$ but less than $V_i$; and (5) selecting another single row electrode, the remaining row electrodes becoming the nonselected row electrodes and repeating steps (2) through (4).

8. The method of claim 7 including the steps of:

(a) applying to the selected row electrode the average voltage $V_{aa}$ for a third portion of the time period;

(b) applying to the on column electrodes the high voltage $V_{ch}$ during the third portion of the time period; and (c) applying to the off column electrodes the low voltage $V_{cl}$ during the third portion of the time period.

9. The method of claim 7 including the step of limiting the current between the electrode portions of each cell.

10. The method of claim 7 wherein step (a) includes the substep of selecting the single row electrode so that it is vertically oriented, and wherein step (b) includes the substep of selecting the on column electrodes and off column electrodes so that they are horizontally oriented.

* * * * *